United States Patent
Cargille et al.

(10) Patent No.: US 7,613,814 B2
(45) Date of Patent: Nov. 3, 2009

(54) DISCOVERING TRANSACTIONS SILENTLY PROPAGATED OFF-MACHINE

(75) Inventors: Jonathan M. Cargille, Seattle, WA (US); Kapil Gupta, Redmond, WA (US); Max A. Feingold, Bellevue, WA (US); Michael R. Clark, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 516 days.

(21) Appl. No.: 11/425,283

(22) Filed: Jun. 20, 2006

(65) Prior Publication Data

US 2007/0294412 A1  Dec. 20, 2007

(51) Int. Cl.
*G06F 15/16* (2006.01)

(52) U.S. Cl. .................................................. 709/227

(58) Field of Classification Search ............... 709/227; 707/100; 705/785, 64, 65
See application file for complete search history.

(56) References Cited

U.S. PATENT DOCUMENTS

| | | | |
|---|---|---|---|
| 5,363,121 A | | 11/1994 | Freund |
| 5,920,863 A | | 7/1999 | McKeehan et al. |
| 5,943,424 A | | 8/1999 | Berger et al. |
| 6,205,464 B1 | | 3/2001 | Cobb et al. |
| 6,442,629 B1 | * | 8/2002 | Arimilli et al. ............... 710/100 |
| 6,470,342 B1 | * | 10/2002 | Gondi et al. .................. 707/10 |
| 6,542,922 B1 | | 4/2003 | Chessell et al. |
| 6,671,716 B1 | * | 12/2003 | Diedrichsen et al. ......... 709/203 |
| 6,728,958 B1 | | 4/2004 | Klein et al. |
| 7,120,609 B1 | * | 10/2006 | Kerkdijk ....................... 705/78 |
| 7,509,426 B2 | * | 3/2009 | Park et al. .................... 709/227 |
| 7,509,642 B1 | * | 3/2009 | Mitchell et al. .............. 718/101 |
| 2002/0123973 A1 | * | 9/2002 | Eccles et al. .................. 705/75 |
| 2002/0161591 A1 | * | 10/2002 | Danneels et al. ............... 705/1 |
| 2004/0123293 A1 | * | 6/2004 | Johnson ....................... 718/101 |
| 2005/0004952 A1 | | 1/2005 | Suzuki et al. |
| 2005/0144301 A1 | * | 6/2005 | Park et al. .................... 709/230 |

OTHER PUBLICATIONS

Yurt Breitbart, Avi Silberschatz, and Glenn R. Thompson "Reliable Transaction Management in a Multidatabase System", pp. 215-224, Copyright 1990 ACM, http://delivery.acm.org/10.1145/100000/98731/p215-breitbart.pdf?key1=98731&key2=1083404411&coll=GUIDE&dl=GUIDE&CFID=68645367&CFTOKE=62152366, (PDF Attachment entitled Article 1).

(Continued)

*Primary Examiner*—Krisna Lim
(74) *Attorney, Agent, or Firm*—Workman Nydegger

(57) ABSTRACT

Discovering transaction managers participating in a transaction. A method may be practiced, for example, in a commit tree topology including a number of transaction managers to manage transactions. The transactions include a set of operations that are all performed if a transaction is completed or all aborted if a transaction is not completed. The transaction managers store transaction result information to allow recovery of a transaction in case of system failure. The method includes receiving at a first transaction manager, a token from a second transaction manager on a machine external to the first transaction manager. The token specifies that the first transaction manager is the originator of the token. The token is associated with a transaction. The first transaction manager identifies that it has not previously participated in the transaction associated with the token. A transaction manager is identified that is participating in the transaction associated with the token.

16 Claims, 2 Drawing Sheets

OTHER PUBLICATIONS

Va-On Tam and Meichun Hsu "Token Transactions: Managing Fine-Grained Migration of Data", pp. 344-356, Copyright 1990 ACM, http://delivery.acm.org/10.1145/300000/298586/p344-tam.pdf?key1=298586&key2=0264404411&coll-ACM&dI=GUIDE&CFID=68645757&CFTOKEN=71823472, (PDF Attachment entitled Article 2).

Wanlei Zhou and Weijia Jia "A token-based independent update protocol for managing replicated objects", pp. 189-207, vol. 17 No. 3, May 2002, http://anyserver.cityu.edu.hk/weijia/2002/Zhou02.pdf, (PDF Attachment entitled Article 3).

* cited by examiner

DISCOVERING TRANSACTIONS SILENTLY PROPAGATED OFF-MACHINE

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computer systems may include databases that store data items. It may be important to ensure that changes to one database are not made if related changes to another database are not made. For example, consider the banking environment. Suppose a customer wants to transfer $100 from one account to another account. The first account will be debited $100 while the second account is credited $100. If one of the debiting and crediting take place but not both, errors will result. If the debiting takes place without the crediting, $100 will be lost. If the crediting takes place without the debiting, $100 is created in the second account.

To prevent these types of errors from occurring, transaction systems with appropriate safeguards are used. Some transaction systems use a distributed commit tree protocol to ensure atomicity, i.e. ensuring that a set of actions in a transaction are all performed or all aborted. For example, a transaction system may use a two phase commit protocol. Transaction aware resources, such as databases or applications, enlist in a transaction as required by the actions that an application takes. A transaction manager then sends a request to prepare to commit to each of the resource managers. Each of the resource managers prepares to commit their changes; this means they make all necessary changes or reserve all the necessary resources required to complete or undo the work associated with the transaction. For durable resources, they will write information to their durable store. If they complete all their preparations, they can then send a yes vote indicating that the resource manager is prepared to commit, or finalize, actions in the transaction. The transaction manager writes a commit record in its log and then issues an order to commit or an order to abort to each of the resource managers. The log allows the transaction manager to be used to recover for system failures during the processing of a transaction. If a resource manager receives an order to commit, the resource manager makes data associated with the action available and releases all resource locks. If a resource manger receives an order to abort, the resource manager aborts and undoes any changes associated with the work associated with the transaction and releases all resource locks. If a system goes down before it has received an order to commit or abort, the order can be subsequently reissued by using information stored in the log.

Transaction systems may be distributed across a number of different interconnected computer systems implemented in a distributed computing environment. Various transaction managers may be implemented on the same computer system or on different computer systems in the distributed environment. A number of transaction managers may all be part of the same transaction. Some local transaction managers may manage commit tree protocol messages only on the local machine while distributed transaction managers manage commit tree protocol messages to other machines. The communication between the transaction managers may be arranged in a hierarchy where some are subordinate transaction managers and some are superior transaction managers in relation to each other. As such, the transaction managers may form a tree which is referred to herein as a "commit-tree". Increased registration of transaction managers with one another increases the amount of storage overhead that is required. Additionally, this frequently increases the linear execution time, as normally the log writes may be serialized between a superior and a subordinate transaction manager. This increased overhead can have a detrimental effect on system performance.

Typically, a transaction on a local machine is managed by a distributed transaction manager on the local machine that is able to manage transactions off of the local machine so that if the transaction involves applications off of the local machine, commit tree protocol messaging can take place. In particular, commit tree protocol messaging is a pull based protocol such that the originator of a transaction and corresponding commit tree protocol messages does not know beforehand all of the destinations of the commit tree protocol messages. Thus, while a transaction may only involve local applications and resources, an originating transaction manager is not aware of this beforehand and therefore involves a distributed transaction manager in case the transaction involves off machine transaction managers. This, of course, comes with a performance penalty as described above.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of discovering transaction managers participating in a transaction. The method may be practiced, for example, in a commit tree topology including a number of transaction managers to manage transactions. The transactions include a set of operations that are all performed if a transaction is completed or all aborted if a transaction is not completed. The transaction managers store transaction result information to allow recovery of a transaction in case of system failure. The method includes receiving at a first transaction manager, a token from a second transaction manager on a machine external to the first transaction manager. The token specifies that the first transaction manager is the originator of the token. The token is associated with a transaction. The first transaction manager identifies that it has not previously participated in the transaction associated with the token. A transaction manager is identified that is participating in the transaction associated with the token.

Another embodiment described herein includes a method of distributed transaction management. The method may be practiced, for example, in a distributed computing environment, including a number of machines distributed in the environment. The environment includes local machines that include a local transaction manager. The local transaction manager is configured to manage transactions locally on the local machine and a distributed transaction manager is configured to manage transactions across machines. The method includes registering a local transaction manager on a local machine with a distributed transaction manager on the local machine. The local transaction manager receives a token template. The token template specifies that the distributed transaction manager is the originator of the token template. A token is created for a transaction managed by the local transaction manager from the token template. The token is sent from the local machine to another machine.

Another embodiment described herein includes a system for managing transactions. The system includes one or more distributed transaction managers at a local machine. The one or more distributed transaction managers are configured to manage transactions off of the local machine. The system further includes one or more local transaction managers at the local machine configured to manage transactions on the local machine. The local transaction manager is configured to register with the distributed transaction manager. The distributed transaction manager is configured to provide the local transaction manager with a token template identifying the distributed transaction manager as the source of any tokens created using the token template.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

In one embodiment, computing resources can be conserved by limiting the number of transaction managers participating in a transaction to a minimal number. This can be accomplished by engaging a transaction manager in a transaction only when that transaction manager needs to be engaged. Transaction managers may often be implemented in distributed environments where interacting transaction managers are located on different machines from one another. However, making all transaction managers in the distributed environment knowledgeable about all transactions or transaction managers across the distributed environment may result in a performance penalty when a transaction can be completed by only interacting with local transaction managers on the same machine. Thus, some of the embodiments described herein allow for more efficient transaction management by engaging a distributed transaction manager used for communication off of the local machine only when such a transaction manager is needed. While some examples described herein relate to engaging a transaction manager for off machine communication, it will be appreciated that the concepts described can be applied to on machine transaction managers and other topologies.

Figure 1:
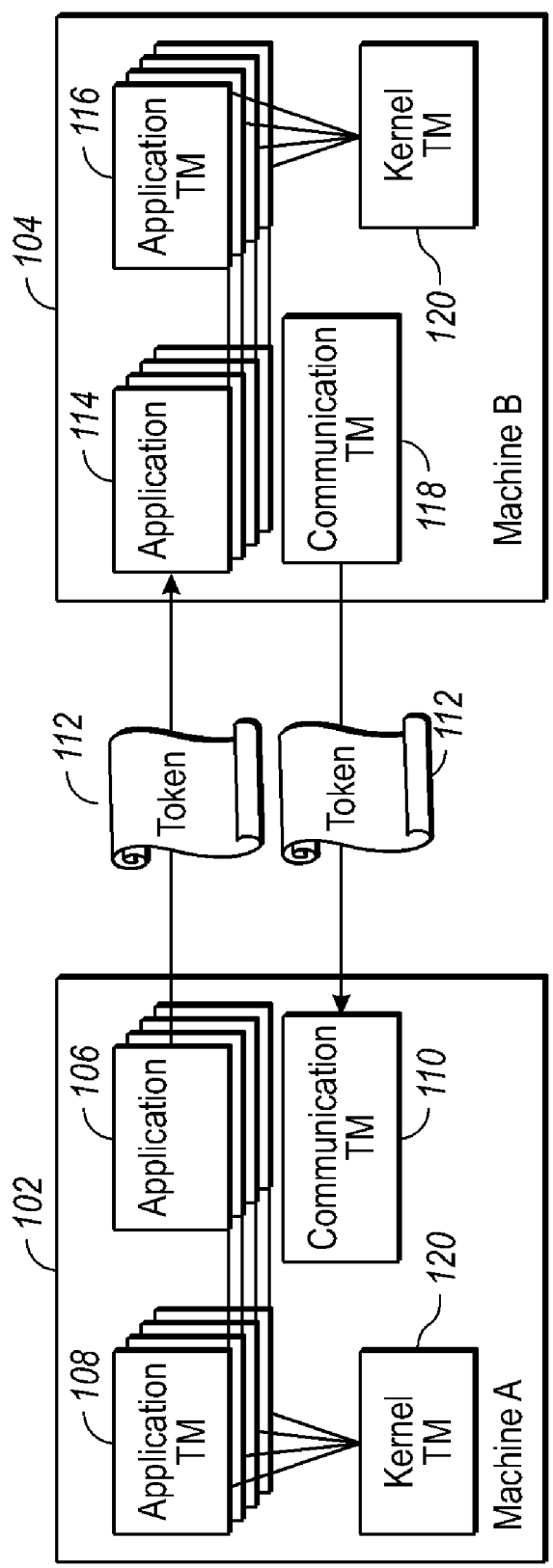
FIG. 1 illustrates a distributed transaction management environment.

Referring now to FIG. 1, an exemplary embodiment is illustrated. FIG. 1 illustrates two machines including machine A 102 and machine B 104. With attention now directed to machine A 102, machine A 102 includes a number of applications 106. While applications are shown in this example, it should be appreciated that other resources, such as databases or other resources, and associated resource managers may also be used in a similar fashion. The applications 106 may be applications that use commit protocol messages to participate in transactions. The applications 106 are coupled to application transaction managers 108. In one embodiment, it may be desirable to maintain transaction managers close to the applications that the transaction managers manage. To accomplish this in the example shown in FIG. 1, each application 106 corresponds to its own specific application transaction manager 108.

In the embodiment shown, the application transaction managers 108 register with a communication transaction manager 110. The communication transaction manager 110 is a distributed transaction manager that is able to communicate with transaction managers off of the local machine A 102. Registering with the communication transaction manager 110 does not cause a particular communication transaction manager 108 to participate in every transaction manager managed by the application transaction managers 108. Rather, registering with the communication transaction manager 110 allows an application manager to obtain a token template as explained in more detail below, and as such, to indicate that it may perform autonomous propagations in the future.

When an application transaction manager 108 registers with the communication transaction manager 110, the communication transaction manager 110 provides the application transaction manager 108 with a token template. The token template can be used by the application transaction manager 108 to create a token 112 that is used in commit protocol messaging. In particular, the token 112 may be used to indicate to recipients of the token 112 that the transaction manager originating the token 112 is the communication transaction manager 110 even when the transaction manager originating the token 112 is one of the application transaction managers 108. As will be described later herein, this facilitates engaging the communication transaction manager 110 when transactions involve transaction managers off of the local machine A 102.

In particular in one embodiment, a token may be made up of a transaction identifier and the identity and address of a distributed transaction manager such as the communication transaction manager 110. The template token, in one embodiment, may have a null transaction identifier with the actual communication transaction manager 110 identity and address. To specialize the token, the application transaction manager 108 fills in a transaction identifier itself.

In the embodiment shown in FIG. 1, a token 112 can be used to propagate the transaction in an environment. Propagation is the mechanism used by the transaction system to extend a transaction to include further application or resource manager instances. In one embodiment, propagation occurs through an infection model. In this model, a source application or resource manager that is already part of the transaction acquires a token that it can pass along to another target application or resource manager instance. The target application or resource manager instance that receives the token can then contact its target transaction manager with the token. The target transaction manager, using the token, can contact the source transaction manager associated with the source application or resource manager to ensure that transaction commitment will proceed correctly.

Returning once again to the example illustrated in FIG. 1, as described previously, even though the token 112 is issued by the application 106 and application transaction manager 108, the token 112 identifies the communication transaction manager 110 as the source of the token 112. In the embodiment shown in FIG. 1, the application 106 on the local machine A 102 sends the token 112 to an application 114 on the machine B 104. The application 114 passes the token 112 to its corresponding application transaction manager 116. The application manager 116 communicates with the communication transaction manager 118 and passes the token 112 to the communication transaction manager 118. The communication transaction manager 118 then passes the token 112 to the communication transaction manager 110 on the local machine A 102.

The communication transaction manager 110 examines the token 112 to determine if the communication transaction manager 110 is already participating in managing the transaction associated with the token 112. If the communication transaction manager 110 is already participating in managing the transaction associated with the token 112, then the transaction will proceed in an ordinary fashion. However, if the communication transaction manager 110 is not already participating in the transaction associated with the token 112, then the communication transaction manager 110 will attempt to identify one or more transaction managers that are already participating in the transaction associated with the token 112.

Because the communication transaction manager 110 receives the token 112 as a result of the token 112 indicating that the communication transaction manager 110 is the source of the token 112, the communication transaction manager 110 knows that the transaction manager that generated the token 112 is a transaction manager that has registered with the communication transaction manager 110. The communication transaction manager 110 can then assume that the transaction manager that generated the token 112 is on the same local machine as the communication transaction manager 110 or within a predefined group of transaction managers associated with the communication transaction manager 110. The communication transaction manager 110 can then use one or more of several mechanisms to identify an application transaction manager 108 that either generated the token 112 and is therefore participating in the transaction associated with that token 112 or to identify other transactions managers participating in the transaction associated with the token 112.

In one embodiment, the communication transaction manager can identify a transaction manager that is participating in the transaction by consulting a repository cataloging transaction managers participating in transactions. For example, the repository may be included as part of another transaction manager. For example, FIG. 1 illustrates a kernel transaction manager 120 on the local machine A 102. The application transaction managers 108 may register with the kernel transaction manager 120 with an indication of those transactions in which they are currently participating. As such, the communication transaction manager 110 can consult the kernel transaction manager to identify a transaction manager participating in the transaction associated with the token 112.

In another embodiment a repository may include one or more of a file, shared memory, a registry entry, a database or the like which includes a correlation between application transaction manager 108 and transactions. The communication transaction manager 110 can then consult the repository to identify a transaction manager participating in the transaction associated with the token 112.

In an alternative embodiment, the communication transaction manager 110 may identify a transaction manager that is participating in the transaction associated with the token 112 by polling transaction managers. For example, the communication transaction manager 110 may poll the application transaction managers 108 to determine which application transaction managers are participating in the transaction associated with the token 112. Polling may be performed, for example, by providing information in the token 112 to the application transaction managers 108 or by requesting information about transactions in which the application transaction managers are participating.

In an alternative embodiment, the communication transaction manager 110 may identify a transaction manager that is participating in the transaction associated with the token 112 by recursively discovering transaction managers by delegating the task of identifying a transaction manager that is participating in the transaction to another transaction manager. For example, the communication transaction manager 110 may delegate the task of identifying a transaction manager participating in a transaction associated with the token 112 to one of the application transaction managers 108. That application transaction manager can then attempt to discover a transaction manager participating in the transaction associated with the token 112 itself, or can delegate the task further to other transaction managers. In one embodiment, a transaction manager to which the task has been delegated checks to see if it is involved in the transaction, and if it is not, the transaction manager delegates the task to another transaction manager.

In an alternative embodiment, the communication transaction manager 110 may identify a transaction manager that is participating in the transaction associated with the token 112 by receiving the token associated with the transaction using a custom protocol where the custom protocol can be used to identify transactions managers participating in the transaction. A custom network communications protocol can be used to de-couple distributed transaction propagation and coordination from specific transaction manager infrastructure. A propagation protocol may act on the behalf of an application to propagate transactions in a custom manner. An in-process agent representing the propagation protocol can request a propagation token from its local transaction manager and then use a protocol-specific mechanism to flow the transaction to another application, including that token in the payload. The receiving application would use its own in-process propagation protocol agent, which would enlist the local and distributed transaction manager hierarchy as subordinate to itself, while performing the equivalent of a pull request using its own custom mechanisms. The propagation protocol from the propagating side, in the example machine A 102, will receive that request, including the original token and pass it along to the distributed transaction manager, in this example communication transaction manager 110, which would then apply the same logic described above to locate the appropriate local application transaction manager.

In an alternative embodiment, the communication transaction manager 110 may identify a transaction manager that is participating in the transaction associated with the token 112 by consulting information in the token associated with the transaction. For example, the information in the token may include a transaction identifier associated with a particular transaction manager. Alternatively, or in one specific example, the transaction identifier may include a numeric identifier in a range of numeric identifiers associated with a particular transaction manager. Alternatively, the information in the token may include a direct statement of one or more transaction managers participating in a transaction. In one example the token generated by the local application transaction manager 108 may include extensible fields in addition to well-known or schematized data. The communication transaction manager 110 needs to understand certain fields of the token to locate the originating local application transaction manager. However, the originating local application transaction manager may include additional custom information in the token that the distributed communication transaction manager 110 will not understand, but will round-trip back to the local application transaction manager 108 when the local application transaction manager 108 is asked to recognize the transaction.

Figure 2:
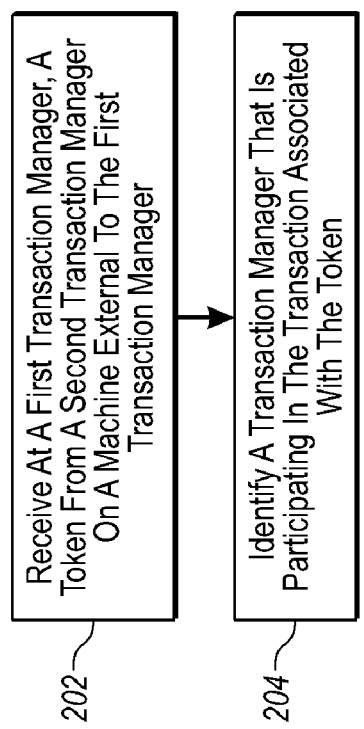
FIG. 2 illustrates a method of managing transactions.

Referring now to FIG. 2, a method 200 of discovering transaction managers participating in a transaction is illustrated. As described above, the method may be practiced for example, in a commit tree topology including a number of transaction managers to manage transactions. The transactions include a set of operations that are all performed if a transaction is completed or all aborted if a transaction is not completed. The method includes receiving at a first transaction manager, a token from a second transaction manager on a machine external to the first transaction manager (act 202). As illustrated in FIG. 1, in one exemplary embodiment, the communication transaction manager 110 may receive the token 112 from the communication transaction manager 118 on a separate machine.

The method 200 further includes identifying a transaction manager that is participating in the transaction associated with the token. As described previously, identifying a transaction manager may be performed in a number of different ways, including referencing a repository, polling transaction manager, examining information in the token itself, by the protocol that the token is sent, etc.

Figure 3:
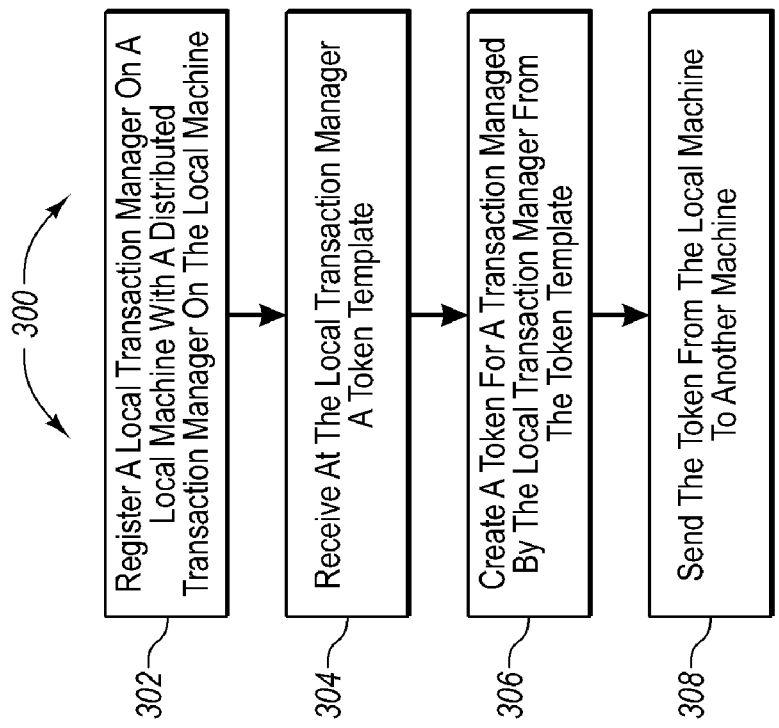
FIG. 3 illustrates another method of managing transactions.

Referring now to FIG. 3, a method 300 of distributed transaction management is shown. The method 300 may be practiced, for example, in a distributed computing environment, including a number of machines distributed in the environment. The environment includes local machines that include a local transaction manager. The local transaction manager is configured to manage transactions locally on the local machine. A distributed transaction manager is configured to manage transactions across machines. The method includes registering a local transaction manager on a local machine with a distributed transaction manager on the local machine (act 302). For example, the application transaction manager 108 may register with a communication transaction manager as illustrated in FIG. 1.

The method 300 further includes receiving at the local transaction manager a token template (act 304). For example, the communication transaction manager 110 may provide a token template to an application manager 108 as illustrated in FIG. 1. The token template may include information identifying the communication transaction manager 110 as the source of any tokens created using the token template. This allows other machines, such as machine B 104, to communicate with a distributed transaction manager on the local machine such the local transaction manager is engaged in a transaction when the transaction involves inter-machine transaction management.

The method 300 further includes creating a token for a transaction managed by the local transaction manager from the token template (act 306). As described above, in one embodiment, the token template includes a null transaction identifier and an identity and address for the distributed transaction manager. Creating a token for a transaction managed by the local transaction manager, in this example, include filling in the transaction identifier. In one embodiment, the transaction identifier is numeric identifier in a range of numeric identifiers associated with the local transaction manager.

The method further includes sending the token from the local machine to another machine (act 308). For example, FIG. 1 illustrates an application 106 sending the token 112 to an application 114 on machine B 104.

Application of the principles described herein may be applied to several different environments and embodiments. For example, in one embodiment, the transaction managers may communicate using Web Services. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. For example, a WS-Atomic Transaction (WS-AT) formatter can be used to propagate transactions, where a WS-AT service operates in a function similar to the distributed communication transaction manager described above.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a commit tree topology including a plurality of transaction managers to manage transactions, the transactions including a set of operations that are all performed if a transaction is completed or all aborted if a transaction is not completed, the transaction managers storing transaction result information to allow recovery of a transaction in case of system failure, a method of discovering transaction managers participating in a transaction, the method comprising the following acts:

receiving at a first transaction manager, a token from a second transaction manager on a machine external to the first transaction manager, the token specifying that the first transaction manager is the originator of the token, wherein the token is associated with a transaction;

identifying that the first transaction manager has not previously participated in the transaction associated with the token; and identifying a transaction manager that is participating in the transaction associated with the token, wherein identifying a transaction manager that is participating in the transaction comprises recursively discovering transaction managers associated with the transaction by delegating the task of identifying a transaction manager that is participating in the transaction to another transaction manager.

2. The method of claim 1, wherein identifying a transaction manager that is participating in the transaction comprises consulting a repository cataloging transaction managers participating in transactions.

3. The method of claim 2, wherein the repository comprises a third transaction manager.

4. The method of claim 3, wherein the third transaction manager comprises a kernel transaction manager on the same machine as the first transaction manager.

5. The method of claim 2, wherein the repository comprises one or more of a file, shared memory, a registry entry, or a database.

6. The method of claim 1, wherein identifying a transaction manager that is participating in the transaction comprises polling transaction managers.

7. The method of claim 1, wherein identifying a transaction manager that is participating in the transaction comprises receiving the token associated with the transaction using a custom protocol where the custom protocol can be used to identify transactions managers participating in the transaction.

8. The method of claim 1, wherein identifying a transaction manager that is participating in the transaction comprises consulting information in the token associated with the transaction.

9. The method of claim 8, wherein the information in the token comprises a transaction identifier associated with a particular transaction manager.

10. The method of claim 9, wherein the transaction identifier comprises a numeric identifier in a range of numeric identifiers associated with a particular transaction manager.

11. The method of claim 8, wherein the information in the token comprises a direct statement of one or more transaction managers participating in a transaction.

12. In a distributed computing environment, including a plurality of machines distributed in the environment, including local machines that include a local transaction manager, the local transaction manager configured to manage transactions locally on the local machine and a distributed transaction manager configured to manage transactions across machines, a method of distributed transaction management, the method comprising:
  registering a local transaction manager on a local machine with a distributed transaction manager on the local machine;
  receiving at the local transaction manager a token template, wherein the token template specifies that the distributed transaction manager is the originator of the token template;
  creating a token for a transaction managed by the local transaction manager from the token template;
  sending the token from the local machine to another machine
  receiving the token at the distributed transaction manager from the other machine; and
  identifying that the local transaction manager is managing a transaction associated with the token, wherein identifying that the local transaction manager is managing a transaction associated with the token comprises at least one of consulting a repository cataloging transaction managers participating in transactions, polling transaction managers, recursively discovering transaction managers associated with the transaction, receiving the token via a custom protocol that can be used to identify transaction managers participating in the transaction, or consulting information in the token.

13. The method of claim 12, wherein the token template comprises a null transaction identifier and an identity and address for the distributed transaction manager, and wherein creating a token for a transaction managed by the local transaction manager comprises filling in the transaction identifier.

14. The method of claim 13, wherein the transaction identifier is numeric identifier in a range of numeric identifiers associated with the local transaction manager.

15. In a distributed computing environment, including a plurality of machines distributed in the environment, including local machines that include a local transaction manager, the local transaction manager configured to manage transactions locally on the local machine and a distributed transaction manager configured to manage transactions across machines, a system for managing transactions, the system comprising:
  one or more distributed transaction managers at a local machine, the one or more distributed transaction managers configured to manage transactions off of the local machine;
  one or more local transaction managers at the local machine configured to manage transactions on the local machine, wherein the local transaction manager is configured to register with the distributed transaction manager, and the distributed transaction manager is configured to provide the local transaction manager with a token template identifying the distributed transaction manager as the source of any tokens created using the token template; and
  a repository referenceable by the distributed transaction manager, the repository coordinating transaction managers with transactions, such that the distributed transaction manager can identify a local transaction manager associated with a token created from the token template, when the distributed transaction receives a token created from the token template.

16. The system of claim 15, wherein the one or more distributed transaction managers comprise WS-Atomic Transaction formatters.

* * * * *

UNITED STATES PATENT AND TRADEMARK OFFICE
CERTIFICATE OF CORRECTION

| | | |
|---|---|---|
| PATENT NO. | : 7,613,814 B2 | Page 1 of 1 |
| APPLICATION NO. | : 11/425283 | |
| DATED | : November 3, 2009 | |
| INVENTOR(S) | : Jonathan M. Cargille et al. | |

It is certified that error appears in the above-identified patent and that said Letters Patent is hereby corrected as shown below:

In column 1, line 46, delete "manger" and insert -- manager --, therefor.

In column 7, line 36, after "manager" insert -- 110 --.

Signed and Sealed this
Twenty-second Day of February, 2011

David J. Kappos
*Director of the United States Patent and Trademark Office*